United States Patent [19]

Schleiferböck

[11] Patent Number: 5,712,428

[45] Date of Patent: Jan. 27, 1998

[54] PRESSURE SENSOR WITH A SOLID TO MINIMIZE TEMPERATURE-RELATED MEASUREMENT ERROR

[75] Inventor: Detlef Schleiferböck, Hausen, Germany

[73] Assignee: Endress & Hauser GmbH, Maulburg, Germany

[21] Appl. No.: 665,463

[22] Filed: Jun. 18, 1996

[30] Foreign Application Priority Data

Aug. 1, 1995 [EP] European Pat. Off. ............. 95112075
Feb. 23, 1996 [EP] European Pat. Off. ............. 96102705

[51] Int. Cl.$^6$ .............................. G01L 19/04; G01L 7/08
[52] U.S. Cl. ........................................... 73/708; 73/715
[58] Field of Search ........................ 73/706, 708, 715, 73/716, 723

[56] References Cited

U.S. PATENT DOCUMENTS

| | | | |
|---|---|---|---|
| 3,024,649 | 3/1962 | Taber | 73/706 |
| 4,050,314 | 9/1977 | Longhetto | 73/715 |
| 4,052,899 | 10/1977 | Longhetto | 73/715 |
| 4,617,607 | 10/1986 | Park et al. | |
| 4,686,764 | 8/1987 | Adams et al. | |
| 4,841,777 | 6/1989 | Hershey et al. | 73/706 |
| 4,852,466 | 8/1989 | Freeman et al. | 73/715 |
| 4,862,916 | 9/1989 | Gaunt | 73/715 |
| 4,920,972 | 5/1990 | Frank et al. | |
| 5,329,819 | 7/1994 | Park et al. | |

FOREIGN PATENT DOCUMENTS

| | | |
|---|---|---|
| 0 403 257 | 12/1990 | European Pat. Off. |
| A 3344 799 | 6/1985 | Germany |
| A 42 31 120 | 3/1994 | Germany |

OTHER PUBLICATIONS

Druckmittler, by H. Julien, 1990 pp. 7 and 8 (No English Translation).

Primary Examiner—Elizabeth L. Dougherty
Assistant Examiner—William L. Oen
Attorney, Agent, or Firm—Bose McKinney & Evans

[57] ABSTRACT

The invention provides a pressure detector which has a small temperature-related measurement error, can be used in particular for small measurement ranges and has a sensor element (1), a sensor diaphragm (11) secured at its border, the non-secured parts of which sensor diaphragm can be deflected on account of the pressure which is to be measured, a housing (2), fastening means (3) for fixing the border of the sensor diaphragm (11) in the housing (2), a diaphragm (4) which closes off the housing (2) and is to be supplied with a pressure which is to be measured, and a solid body (5) with a modulus of elasticity which is suitable for minimizing the temperature-related measurement error, which solid body is arranged between the diaphragm (4) and the deflectable part of the sensor diaphragm (11) and which solid body transmits the pressure from the diaphragm (4) to the sensor diaphragm (11).

9 Claims, 2 Drawing Sheets

PRESSURE SENSOR WITH A SOLID TO MINIMIZE TEMPERATURE-RELATED MEASUREMENT ERROR

FIELD OF THE INVENTION

The invention relates to pressure detectors.

Pressure detectors have to fulfill different requirements in a large number of applications. Thus, e.g. in the foodstuffs industry, flush-front pressure detectors e.g. consisting of stainless steel, are often required for reasons of hygiene. On the other hand, the chemical industry frequently places special requirements on the chemical resistance of those components of pressure detectors which are in contact with a medium. In applications with abrasive media, there are often special requirements on the mechanical resistance of the components in contact therewith. Furthermore, in a large number of applications, pressure detectors are exposed to particularly high or low ambient temperatures.

DESCRIPTION OF THE PRIOR ART

In order to fulfill these requirements, pressure detectors are used in conjunction with diaphragm seals, for example, as is described on Pages 7 and 8 of H. Julien's book, which appeared in Munich in 1990, entitled "Druckmittler" [Diaphragm seals].

In this book, a description is given of pressure detectors having a sensor element, a housing, fastening means for fixing the sensor element in the housing a diaphragm seal with a diaphragm which closes off the diaphragm seal and is to be supplied with a pressure which is to be measured, a closed-off cavity arranged in the diaphragm, a thin line leading from the cavity to the sensor element, and a liquid which completely fills the cavity and the line and transmits the pressure from the diaphragm to the sensor element.

The liquid is, for example, a suitable oil which is as incompressible as possible and is to be introduced into the diaphragm seal without bubbles.

A disadvantage with such a pressure detector with a diaphragm seal is that its production, in particular the introduction of the liquid, involves a very high outlay.

A further disadvantage consists in the fact that a diaphragm bed for supporting the diaphragm is necessary in the cavity in order to prevent the diaphragm from being destroyed by a pressure which acts on it and exceeds or drops below the measurement range.

A further disadvantage consists in the fact that a defect, e.g. a hole or tear, in the diaphragm results in the liquid running out. This is critical, in particular, in applications in the foodstuffs industry and in the coatings industry.

A further disadvantage consists in the fact that measurement errors occur as a result of the thermal expansion of the liquid. In the case of small measurement ranges, e.g. 0 Pa to 5 kPa, these errors are particularly large. This is usually remedied by use being made of a diaphragm seal with a diaphragm of large diameter.

U.S. Pat. No. 4,686,764 describes a pressure detector having a sensor element, a housing, fastening means for fixing the sensor element in the housing, a diaphragm which closes off the housing and is to be supplied with the pressure which is to be measured, and a gel-like filling material which fills the cavity formed by the diaphragm, the housing and the sensor element, and which transmits the pressure from the diaphragm to the sensor element.

Here, the diaphragm and filling material merely have the task of protecting the sensor element.

A disadvantage of such a pressure detector is that the active surface area of the sensor element is small in comparison with the surface area of the diaphragm on which the pressure which is to be measured acts. Consequently, the volume within the pressure detector which is to be filled with the gel-like material is large. This produces a virtually isotropic pressure distribution in the filling material. Just as in the case of the pressure detector with diaphragm seal which was described in the introduction, the temperature-related measurement error of a pressure detector of this type is very large, in particular for small measurement ranges.

A further disadvantage consists in the fact that the diaphragm is not protected from, in particular punctiform, mechanical loading. The filling material on which it rests can withstand only relatively large-area loading.

SUMMARY

An object of the invention is to specify a pressure detector which has only a small temperature-related measuring error and can be used, in particular, for small measurement ranges e.g. 0 Pa to 50 kPa, and which has, in particular, a small diaphragm diameter.

For this purpose, the invention comprises a pressure detector having a sensor element with a sensor diaphragm secured at its border, the non-secured part of which sensor diaphragm can be deflected on account of a pressure which is to be measured, a housing, fastening means for fixing the border of the sensor diaphragm in the housing, a diaphragm which closes off the housing and is to be supplied with a pressure which is to be measured, and a solid body with a modulus of elasticity which is suitable for minimizing the temperature-related error, which solid body is arranged between the diaphragm and the deflectable part to the sensor diaphragm and which solid body transmits the pressure from the diaphragm to the sensor diaphragm.

In accordance with one configuration of the invention, the surface area of the deflectable part of the sensor diaphragm and the surface area of the diaphragm which is to be supplied with the pressure are virtually the same size.

In accordance with a further configuration, there is a non-isotropic stress distribution in the solid body when a pressure is applied to the diaphragm.

In accordance with a further configuration, the sensor element has a sensor diaphragm made of ceramic and a basic body made of ceramic, the sensor diaphragm being secured by the basic body.

In accordance with one configuration of the invention, the housing has a central axial bore, and a shoulder which extends radially into the interior of the housing and is integrally formed at an end of the housing which faces the diaphragm, the diaphragm being connected in a pressure-tight manner to said shoulder.

In accordance with a development of said configuration, a cavity which is formed by the diaphragm, the shoulder and the sensor element is completely filled by the solid body.

In accordance with a further configuration of the invention, the solid body has a modulus elasticity which is matched to the rigidity of the diaphragm, and the solid body is preferably an elastomer, in particular an addition crosslinking silicone.

In accordance with another configuration of the invention, the diaphragm is arranged at a spacing from the sensor element, which spacing is dimensioned such that the temperature-related measurement error of the pressure detector is minimal.

In accordance with a further configuration of the invention, the diaphragm is connected, in particular welded, in a pressure-tight and gas-tight manner to the housing.

BRIEF DESCRIPTION OF THE DRAWINGS

The invention will now be explained in more detail with reference to the figures of the drawing, which represent an exemplary embodiment and in which.

DESCRIPTION OF THE PREFERRED EMBODIMENT

Figure 1:
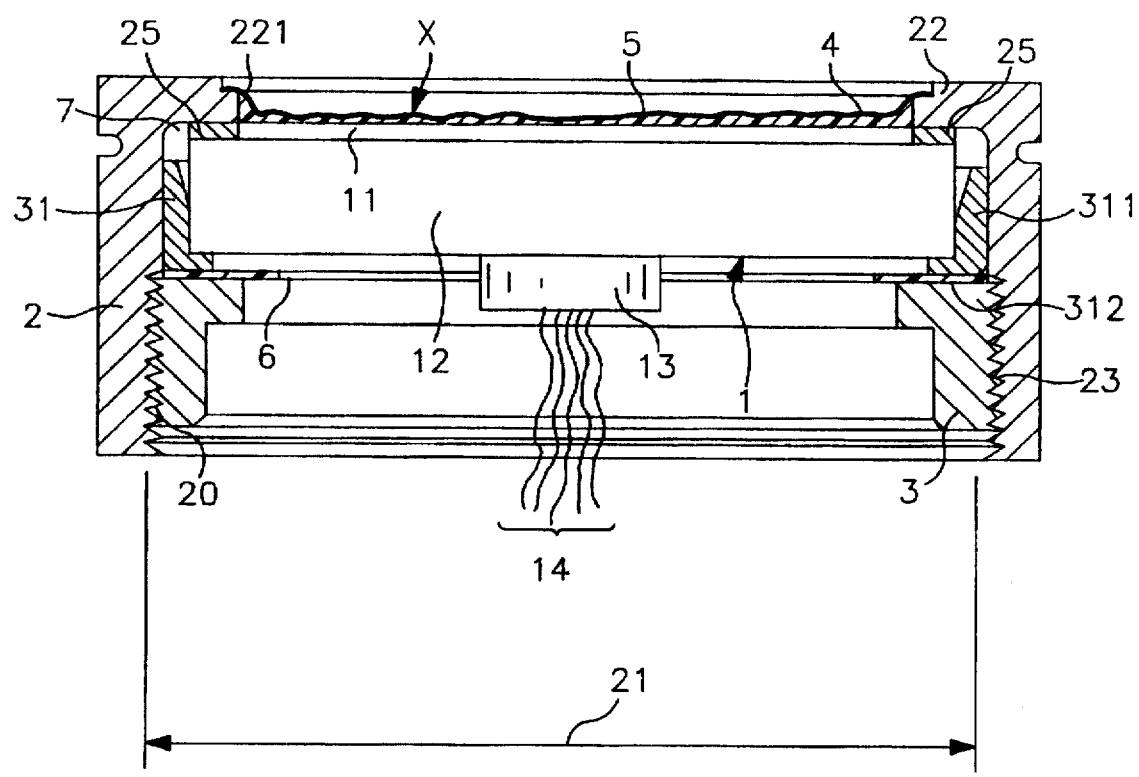
FIG. 1 shows a longitudinal section through a pressure detector.

The exemplary embodiment of a pressure detector which is represented in FIG. 1 comprises four basic elements: a sensor element 1, a housing 2, fastening means 3 for fixing the sensor element 1, and a diaphragm 4 which closes off the housing 2.

The housing 2 is rotationally symmetrical and has a central axial bore 20 having a cross-sectional dimension 21. A shoulder 22 which extends radially into the housing interior is integrally formed at one end of the housing 2. The housing 2 consists, for example, of a stainless steel.

On the outer side of the its inner border, the shoulder 22 has a step 221. The diaphragm 4 is connected, e.g. welded, in a pressure-tight and preferably gas-tight manner to said step 221, and the diaphragm 4 thus closes off one end of the bore 20 having dimension 21. The surface of the diaphragm 4 which faces outwardly from the housing forms the surface on which the pressure which is to be measured acts. Depending on the application, the diaphragm material is, for example, a stainless steel, Hastelloy, Monell or titanium. It is likewise conventional to use diaphragms coated, for example, with Halar or polytetrafluoroethylene.

The sensor element 1 is, for example, a conventional capacitive, cylindrical pressure measuring cell, e.g. made of ceramic, in particular $Al_2O_3$, preferably of 96% purity, which cell comprises a sensor diaphragm 11 and a basic body 12, these being kept at a defined distance from one another, and connected to one another in a hermetically sealed manner on their respective border by a bonding material 25, e.g. an active hard solder. The sensor diaphragm 11 can be deflected in a pressure-dependent manner within the border-side joint. The inner surfaces, coated with electrode material, of the sensor diaphragm 11 and of the basic body 12 format least one measuring capacitor, the capacitance of which depends on the bending of the sensor diaphragm 11 and is thus a measure of the pressure acting on the sensor diaphragm 11.

However, it is also possible to use other types of sensor elements, e.g. pressure sensors which work with strain gauges or with piezoresistive elements, for the invention. These pressure sensors have an electrical variable which depends on the active pressure.

On the side remote from the measuring medium, the sensor element 1 may have an electronic circuit 13 which converts the electrical variable, that is to say the changes in capacitance in the capacitive sensor element 1 above, into a pressure-dependent electrical signal and renders the latter accessible, via electric connection lines 14, for further processing and/or display.

The sensor element 1 is arranged in the housing 2 such that the pressure-sensitive sensor diaphragm 11 rests, by means of an outer border, on an inner surface of the shoulder 22.

The shoulder 22 extends into the housing interior to such an extent that it preferably covers over merely the region of the joint between the sensor diaphragm 11 and the basic body 12. That surface area of the sensor diaphragm 11 which can be deflected in a pressure-dependent manner is thus virtually equal to the surface area of the diaphragm 4 on which the pressure which is to be measured acts.

Arranged on that side of the basic body 12 which is remote from the sensor diaphragm 11 is an angular ring 31 which centers the sensor element 1 in the bore 20 and comprises a tube 311, which partially engages around the basic body 12, and a shoulder 312 which extends radially into the interior of the angular ring 31 and rests on an outer border of the circular surface of the basic body 12 which is remote from the sensor diaphragm 11. The angular ring 31 consists, for example, of a rubber.

The sensor element 1 is fastened in the housing 2 by a fastening means 3, such as a threaded ring which is screwed into an internal thread 23 arranged in the housing 1, against the shoulder 312 of the angular ring 31.

Depending on the choice of the materials of angular ring 31 and threaded ring 3, it is recommended, as is represented in FIG. 1, that a sliding film 6, e.g. an annular polyimide film, be inserted between the two components.

The type of fastening is not fundamental to the invention and can be replaced by any other type of fastening known to a person skilled in the art.

Between the diaphragm 4 and the sensor element 1 there is a gap which is completely filled by a solid body 5 which has a modulus of elasticity which is suitable for minimizing the temperature-related measurement error. A pressure acting on the diaphragm 4 is transmitted to the sensor element 1 by the solid body 5.

Use is preferably made of a solid body 5 whose modulus of elasticity is matched to the rigidity of the diaphragm 4. If the modulus of elasticity of the solid body 5 is too large, then, with a given active pressure, there is only a small deflection of the diaphragm 4 and the sensor diaphragm 11. This means that the measurement range of the pressure detector would be considerably restricted. If the modulus of elasticity of the solid body 5 is too small, then the solid body 5 behaves as does a liquid-filled diaphragm seal with the accompanying disadvantages, in particular as regards temperature-dependent measurement errors.

A suitable solid body 5 is, for example, an addition crosslinking potting compound, e.g. consisting of a silicone elastomer. Such a potting compound has the advantage that, after introduction, no decomposition products are released during curing.

During production of the pressure detector, the diaphragm 4 must first be connected in a pressure-tight and preferably gas-tight manner to the housing 2, e.g. by the outer border of said diaphragm being welded to the step 221. Housing 2 and diaphragm 4 form a cup into which the solid body 5 is to be introduced. This takes place, for example, by an addition crosslinking potting compound being introduced into the cup. The sensor element 1 can then be introduced directly into the still-liquid potting compound and fixed in the housing 2 by means of the angular ring 31, the sliding film 6 and the threaded ring 3. In this arrangement, excess potting compound is forced into a gap 7 between the sensor element 1 and the housing 2. A very thin layer of potting compound with a thickness of a few micrometers remains between the sensor diaphragm 11 and the shoulder 22 of the housing 2. The potting compound then solidifies.

Depending on the choice of material for the solid body 5 and the diaphragm 4, the latter may optionally be pretreated with a suitable adhesion promoter in order to achieve good mechanical coupling between the diaphragm 4 and the solid body 5. Good mechanical coupling of this kind is a prerequisite for the special properties of the pressure detector of the invention as regards the temperature-dependent measurement errors, which will be explained in detail hereinbelow.

Figure 2:
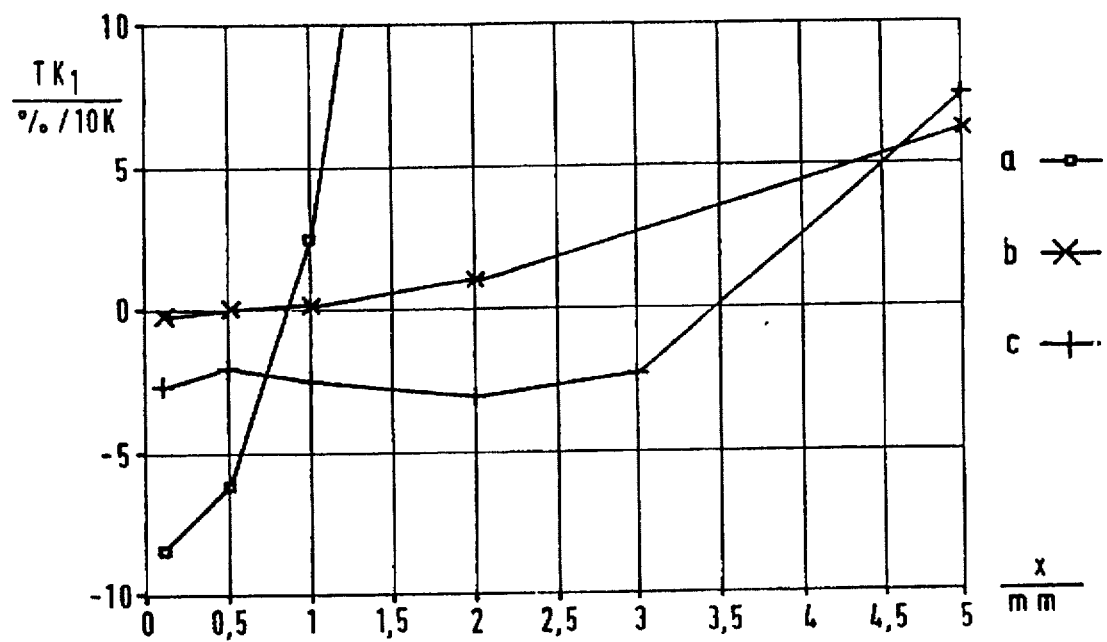
FIG. 2 shows the temperature coefficient $TK_1$ of the null signal as a function of the spacing X between the diaphragm and the sensor element for three different pressure detectors.

For this purpose, FIG. 2 represents results of finite-element calculations, which give a mean temperature coefficient $TK_1$ of the null signal as a function of the spacing X between the diaphragm 4 and the sensor element 1.

The "mean temperature coefficient of the null signal" here designates, in accordance with German Standard DIN 16 086 "Elektrische Druckmeßgeräte"[Electrical pressure-measuring apparatuses], the greatest change, in relation to 10K, of the null signal in the nominal temperature range, the null signal being the output signal of the pressure-measuring detector at the start of the measurement range, and the nominal temperature range being that temperature range in which the pressure detector complies with its specification.

Figure 3:
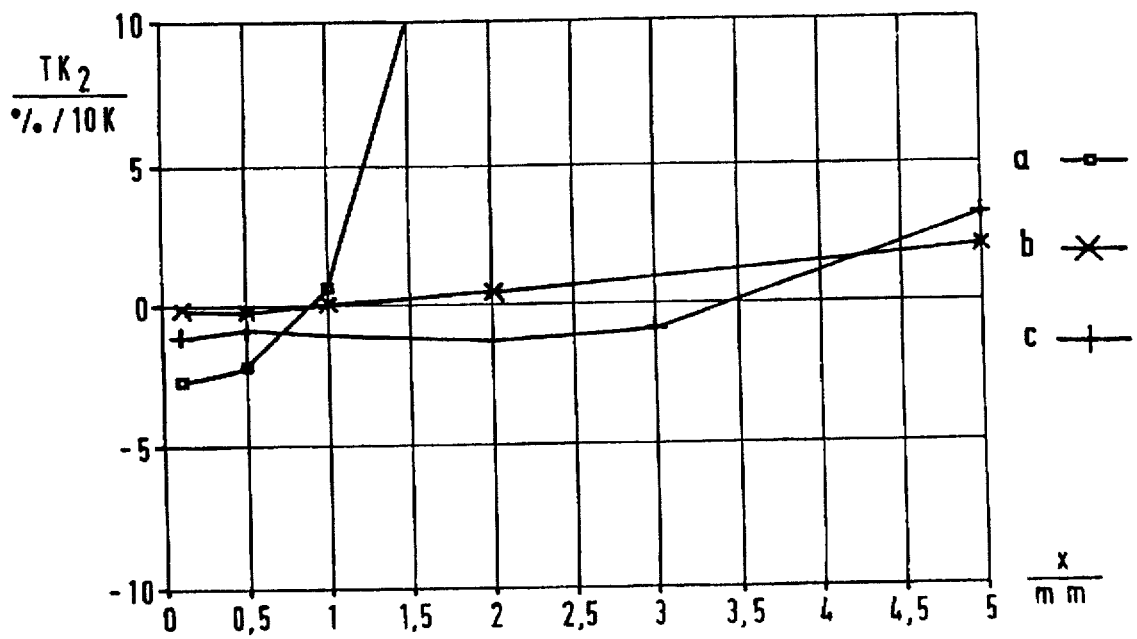
FIG. 3 shows the temperature coefficient $TK_2$ of the output span as a function of the spacing X between the diaphragm and the sensor element for the three pressure detectors.

Furthermore, FIG. 3 represents results of finite-element calculations, which indicate the mean temperature coefficient $TK_2$ of the output span as a function of the spacing X between the diaphragm 4 and the sensor element 1.

The "mean temperature coefficient of the output span" here likewise designates, based on said standard DIN 16 086, the greatest change, in relation to 10K, of the output span in the nominal temperature range, the output span being the difference between the final value and initial value of the output signal, and the nomimal temperature range being as defined above.

The results of the calculations can also, in fact, be obtained within certain error limits by the appropriate pressure detector being constructed and the appropriate values being measured. However, since finite-element calculations can be obtained very much more quickly and cheaply in comparison, only a small number of results, not listed here, were verified by constructed pressure detectors.

The two temperature coefficients $TK_1$, $TK_2$ are given as percentages, the null-signal and output-span value respectively determined at a temperature of 20° C. having being set as reference value, that is to say as 100%.

Since the material of the diaphragm 4 is generally determined by the application, it is only the thickness of the diaphragm 4 which is variable. The rigidity of the diaphragm 4 is set by way of the thickness.

The finite-element calculations are based on the following data:

the diameter of the diaphragm 4 is 30 mm in each case, the diaphragm 4 consists in each case of stainless steel, the nominal temperature range is in each case from −40° C. to +120° C., and the measurement range of the respective temperature detector is from 0 Pa to 10 kPa (from 0 bar to 0.1 bar).

The given variables relate merely to the examples listed here. It is, or course, possible to use such pressure detectors with suitable solid bodies, in particular silicone elastomers, at temperatures of up to 200° C. and more. Moreover, the subject matter of the invention can be used in measurement ranges other than the measurement range from 0 Pa to 10 kPa specified above.

However, in the case of larger measurement ranges, the temperature-related measuring errors are smaller. In the case of smaller measurement ranges, the outlay which is necessary in order to determine the temperature coefficients experimentally increases considerably. In the case of the above-specified measurement range of 0 Pa to 10 kPa, a measurement error of, for example, 0.1% corresponds to a pressure difference of 10 Pa. A test pressure to be applied to the diaphragm 4 has to be provided with sufficient accuracy, here, for example, accurate to the nearest 1 Pa, in order that the measurement error can be measured.

For the curves in FIGS. 2 and 3 which are designated by a the diaphragm is 0.2 mm thick and the solid body 5 has a modulus of elasticity of 2 N/M².

For the curves in FIGS. 2 and 3 which are designated by b the diaphragm 4 is 0.05 mm thick and the solid body 5 has a modulus of elasticity of 0.05 N/mm².

For the curves in FIGS. 2 and 3 which are designated by c the diaphragm 4 is 0.05 mm thick and the solid body 5 is a modulus of elasticity of 2 N/mm².

The curves a in FIGS. 2 and 3 are thus based on a diaphragm 4 with high rigidity and a solid body with a large modulus of elasticity. The temperature coefficient $TK_1$ of the null signal and the temperature coefficient $TK_2$ of the output span rise steeply, and the two temperature coefficients are negative in the case of small spacings X.

The curves b in FIGS. 2 and 3 are based on a diaphragm 4 with low rigidity and a solid body with a small modulus of elasticity. In comparison with the curves a, they rise gradually. The two temperature coefficients assume negative values in the case of small spacings X. The zero crossing of the two curves b is displaced towards smaller spacings X in comparison with the curves a.

Should the zero crossing of the two temperature coefficients, as a function of the spacing X, be displaced towards larger spacings, a diaphragm 4 with less rigidity and a solid body 5 with a larger modulus of elasticity must be used. This is represented in the curves c in FIGS. 2 and 3.

These curves c are likewise very flat, but, in comparison with the curves b, are displaced toward smaller values for the temperature coefficient $TK_1$ of the null signal and the temperature coefficient $TK_2$ of the output span.

A characteristic property produced by the use of the solid body 5 is that negative temperature coefficients $TK_1$, $TK_2$ occur.

This is not the case with liquid-filled diaphragm seals. This is because liquids which are usually used in diaphragm seals have a positive thermal expansion coefficient in the above temperature range. The expansion of the liquid produces an additional pressure in the interior of the diaphragm seal. This produces forces which act equally in all directions.

The diaphragm seal filled with a solid body differs considerably therefrom. In the case of the abovementioned method of installing the sensor element 1 into the housing 2, the mechanical coupling between the solid body 5 and diaphragm 4 produces directional stresses in the interior of the diaphragm seal which counteract the effect of the similarly present thermal expansion of the solid body on the temperature coefficients of the null signal and of the output span. In the case of small spacings X, the effect of the directional stresses predominates the temperature coefficients thus assume negative values. In the case of large spacings X, the effect of the thermal expansion predominates; the temperature coefficients thus assume positive values.

A suitable choice of the thickness of the diaphragm 4 and of the modulus of elasticity of the solid body 5 can ensure that the temperature coefficient $TK_1$ of the null signal and the temperature coefficient $TK_2$ of the output span, as a function of the spacing X, have a zero crossing.

As can be seen from FIGS. 2 and 3, that value of the spacing X at which the temperature coefficient $TK_1$ of the null signal is equal to zero and that value of the spacing X at which the temperature coefficient $TK_2$ of the output span is equal to zero are virtually equal, and the two corresponding curves have a similar profile.

In the production of a pressure detector according to the invention, the spacing X between the diaphragm 4 and the sensor element 1 should thus be dimensioned such that the temperature-related measurement error of the pressure detector is minimal, i.e. such that the temperature coefficient $TK_1$ of the null signal and the temperature coefficient $TK_2$ of the output span are virtually equal to zero.

This dimensioning produces considerable savings in production because the calibration, which is normally very complex, is drastically simplified since the pressure detector has no measurement error resulting from the temperature. It is thus sufficient to determine the characteristic of the pressure detector merely at a single temperature.

Furthermore, the manufacturing tolerances for the components of the pressure detector can be relatively large if the materials and geometries chosen are ones in which the two above temperature coefficients, as a function of the spacing X, have a flat profile, as is represented in the examples b and c in FIGS. 2 and 3.

Whereas the temperature-related measurement errors of conventional liquid-filled diaphragm seals require the use of diaphragm seals with a large diaphragm diameter in the case of small measurement ranges, e.g. in particular, in the case of a measurement range of from 0 Pa to 50 Pa, a diaphragm 4 with a very much smaller diameter can be used in the case of the pressure detector according to the invention. Typical values for a conventional pressure detector with a liquid-filled diaphragm seal are mentioned here for comparison purposes. In the case of such a pressure detector with a diaphragm diameter of 30 mm, the measurement error is in the order of magnitude of 1 kPa per 10K without any additional measurement error corrections. In the case of a measurement range from 0 Pa to 10 kPa, this corresponds to a measurement error of 10% per 10K. Such a pressure detector is thus unusuable.

The small size of the pressure detector according to the invention makes it possible to use pressure detector for small measurement ranges even where space is restricted.

The pressure detector can be cleaned very easily since the diaphragm 4 is installed in the flush-front manner. This is particularly advantageous in the food-stuff industry.

Since the measuring accuracy of the pressure detector is not impaired by the diaphragm 4 in front of it and the solid body 5, it is, then, possible to use such pressure detectors wherever this has not been possible hitherto due to the relatively large measurement errors associated with liquid-filled diaphragm seals.

What is claimed is:

1. A pressure sensor comprising:
   a sensor element (1) including a sensor diaphragm (11) secured at its outer border and having a deflectable part that can be deflected by a pressure which is to be measured,
   a housing (2),
   fastening means (3) for securing the outer border of the sensor diaphragm (11) in the housing (2),
   a diaphragm (4) which closes off the housing (2) and has a deflectable part that can be deflected by the pressure which is to be measured,
   the diaphragm (4) and the sensor diaphragm (11) being spaced apart so that the deflectable parts form a space therebetween having a dimension for minimizing the temperature-related measurement error, and
   a solid body (5) which fills the space between the diaphragm (4) and the sensor diaphragm (11) and transmits the pressure which is to be measured from the diaphragm (4) to the sensor diaphragm (1), the solid body (5) having a modules of elasticity which is determined as a function of the dimension of the space between diaphragm (4) and the sensor diaphragm (11) to minimize the temperature-related measurement error of the sensor.

2. The pressure sensor as claimed in claim 1, wherein a surface area of the deflectable part of the sensor diaphragm (11) and a surface are of the deflectable part of the diaphragm (4) which are to be deflected by the pressure to be measured are virtually the same size.

3. The pressure sensor as claimed in claim 1, wherein there is a non-isotropic stress distribution in the solid body (5) when a pressure is applied to the diaphragm (4).

4. The pressure sensor as claimed in claim 1, wherein the sensor diaphragm (11) is made of ceramic and the sensor element (11) includes a basic body (12) made of ceramic, the outer border of the sensor diaphragm (11) being secured to the basic body (12).

5. The pressure sensor as claimed in claim 1, wherein the housing (2) has a central axial bore (20), and a shoulder (22) which extends radially into the interior of the housing (2) and is integrally formed at one end of the housing (2) which faces the diaphragm (4), the diaphragm (4) being connected in a pressure-tight manner to the shoulder (22).

6. The pressure sensor as claimed in claim 5, wherein a cavity is formed by the diaphragm (4), the shoulder (22) and the sensor element (1) and the cavity is completely filled by the solid body (5).

7. The pressure sensor as claimed in claim 1, wherein the solid body (5) has a modules of elasticity which is matched to the rigidity of the diaphragm (4).

8. The pressure sensor as claimed in claim 5, wherein the solid body (5) is an elastomer, in particular an addition crosslinking silicone.

9. The pressure sensor as claimed in claim 1, wherein the diaphragm (4) is connected, in particular welded, in a pressure-tight and gas-tight manner to the housing (2).

* * * * *

UNITED STATES PATENT AND TRADEMARK OFFICE
CERTIFICATE OF CORRECTION

PATENT NO.    : 5,712,428
DATED         : January 27, 1998
INVENTOR(S) : Detlef Schleiferbock It is certified that error appears in the above-identified patent and that said Letters Patent is hereby corrected as shown below:

On the title page, item [73],
    Change the Assignee's name from "Endress & Hauser GmbH" to "Endress + Hauser GmbH + Co.".

Signed and Sealed this

Twenty-eighth Day of April, 1998

Attest:

BRUCE LEHMAN

Attesting Officer

Commissioner of Patents and Trademarks